US007065251B2

(12) United States Patent
Yadid-Pecht (10) Patent No.: US 7,065,251 B2
(45) Date of Patent: Jun. 20, 2006

(54) METHOD AND APPARATUS FOR PROVIDING ADAPTIVE MULTIPLE RESOLUTION OF OPTICAL IMAGERS

(75) Inventor: Orly Yadid-Pecht, 44 Freud Street, 34753 Haifa (IL)

(73) Assignee: Orly Yadid-Pecht (IL)

( * ) Notice: Subject to any disclaimer, the term of this patent is extended or adjusted under 35 U.S.C. 154(b) by 652 days.

(21) Appl. No.: 10/053,130

(22) Filed: Nov. 13, 2001

(65) Prior Publication Data

US 2002/0106129 A1   Aug. 8, 2002

Related U.S. Application Data

(63) Continuation-in-part of application No. PCT/IL00/00272, filed on May 12, 2000.

(60) Provisional application No. 60/133,941, filed on May 13, 1999.

(51) Int. Cl.
*G06K 9/36* (2006.01)
*H01L 27/00* (2006.01)

(52) U.S. Cl. .................................. 382/232; 250/208.1

(58) Field of Classification Search ........ 382/232–243, 382/250, 162–169, 248; 250/208.1; 348/317
See application file for complete search history.

(56) References Cited

U.S. PATENT DOCUMENTS 5,909,026 A  *  6/1999  Zhou et al. .............. 250/208.1

OTHER PUBLICATIONS

Kemeny, S. et al; "Multiresolution Image Sensor"; Systems for Video Technology; vol. 7, No. 4; Aug. 1997; pp. 575-582.

Strobach, P.; "Quadtree-Structured Interframe Coding of HDTV Sequences"; SPIE vol. 1001 Visual Communications and Image Processing '88; Nov., 1988; pp. 812-819.

Dickinson, A., et al; "A 256×256 CMOS Active Pixel Image Sensor with Motion Detection"; 1995 IEEE International Solid-State Circuits Conference; Feb. 16, 1995; pp. 226-227.

Xia, S., et al; "An All CMOS Foveal Image Sensor Chip"; IEEE International Asic Conference and Exhibit; 1998; pp. 409-413.

(Continued)

*Primary Examiner*—Duy M. Dang
(74) *Attorney, Agent, or Firm*—Baker & McKenzie LLP (57) ABSTRACT

Method for image compression, where an acquired image is represented by a two dimensional array of pixels. The array is divided into blocks of identical rectangular areas. Data related to the division is stored and a threshold of pixel attribute value is determined. The value of each block is calculated, stored and compared to the value of its adjacent blocks. Whenever the difference between two adjacent blocks exceeds the threshold, adjacent compared blocks are divided into sub-blocks. Each sub-blocks contain half the number of pixels and data related to that division is stored. The value of each sub-block is calculated and compared to the value of the adjacent sub-blocks. Whenever the difference between two adjacent compared blocks is below the threshold, the blocks are represented by representative pixels with identical attributes level that equals the value of the pixels that correspond to the compared block or sub-block.

18 Claims, 6 Drawing Sheets

OTHER PUBLICATIONS

Aizawa, K., et al; "A Novel Image Sensor for Video Compression"; Proceedings Icip-94: Austin Convention Center Austin, Texas; Nov. 13, 1994; pp. 591-595.

Panicacci, R., et al; "Programmable multiresolution CMOS active pixel sensor"; SPIE vol. 2654 Proceedings, Intl. Conf. on Image Processing; vol. II of III; Oct. 26-29, 1997; pp. 72-79.

Pardo, F., et al; "Space-Variant Nonorthogonal Structure CMOS Image Sensor Design"; IEEE Journal of Solid-State Circuits; vol. 33, No. 6; Jun. 1998; pp. 842-849.

Aizawa, K., et al; "Implementations of On Sensor Image Compression and Comparisons Between . . . "; Proceedings, 1 st. Intl. Conf. on Image Processing; Oct. 26-29,1997; pp. 258-261.

Kawahito, S., et al; "A CMOS Image Sensor with Analog Two-Dimensional DCT-Based Compression . . . "; IEEE Journal of Solid-State Circuits; vol. 32, No. 12, Dec. 1997; pp. 2030-2041.

* cited by examiner

METHOD AND APPARATUS FOR PROVIDING ADAPTIVE MULTIPLE RESOLUTION OF OPTICAL IMAGERS

CROSS-REFERENCE TO RELATED APPLICATIONS

This is a continuation-in-part of International Application PCT/IL00/00272, with an international filing date May 12, 2000, published in English under PCT Article 21(2). This continuation-in-part of International Application claims the benefit of the U.S. Provisional Patent Application No. 60/133,941, filed May 13, 1999.

FIELD OF THE INVENTION

The present invention relates to the field of optical imagers. More particularly, the invention relates to a method and apparatus for providing on-chip, adaptive multiple resolution for an electro-optical active pixel sensor in real-time.

BACKGROUND OF THE INVENTION

Image coding is a widespread technology for transferring pictures/images over communication channels. Coding of an image in a certain way can be achieved by image compression techniques. When a compressed image is transmitted, a valuable transmission time can be saved, as well as memory resources. A conventional image that can be transmitted consists of an array (a matrix) of N×M pixels, wherein each pixel has a unique value that varies according to the content of the image. For example, if the image has a digital representation in a conventional gray scale, each pixel can have numerical values from 0 (black) to 255 (white).

The main problem of image compression is the degradation in resolution. If the whole image is uniformly compressed, areas that contain less information (less intensity changes between pixels, such as a uniform area) are represented by similar data that is required to represent dense areas that contain more information (greater intensity changes between pixels). Thus, more (and unnecessary) data should be stored and transmitted.

"Programmable multiresolution CMOS active pixel sensor" to R. Panicacci, S. Kemeny, L. Matthies, B. Pain and E. R. Fossum, Proc. SPIE vol.2654 Solid State Sensor Array and CCD Cameras, pp. 72–81, 1996, discloses a CMOS Active Pixel Sensor (APS) that allows the flexibility of placing signal processing circuitry on the imaging focal plane. This APS allows x-y addressability of the array for windows of interest and sparse sampling readout of the array. This multiresolution CMOS APS can perform block (a group of selected pixels) averaging, carried out on-chip, in order to eliminate intensive software processing of the image, which is carried out off-chip. However, the obtained average value is based on full resolution.

"Space-variant non-orthogonal structure CMOS image sensor design", to Pardo, F., B. Dierickx, and D. Scheffer, IEEE Journal of solid state circuits, vol. 33, no. 6, June 1998 discloses a polar imager, in which the resolution is highest in the central area of the sensor array and decreases towards the peripheral areas (e.g., a CMOS log-polar image sensor). However, using such a polar imager requires external control circuitry to focus the camera on the object of interest.

"Pixel parallel and column parallel architectures and their implementations of on sensor image compression" of Aiziwa K., Hamamoto T., Ohtsuka Y., Hartori M. and Abe M. discloses an image compression technique that uses pixel parallel and column parallel architectures. However, in order to achieve the desired compression, an additional full frame analog memory is required.

"A CMOS image sensor with analog two-dimensional DCT-based compression circuits for One-Chip cameras" of Kawahito, S., M. Yoshida, M. Sasaki, K. Umehara, D. Miyazaki, Y. Tadokoro, K. Murata, S. Doushou, A. Matsuzava, IEEE Journal of solid state circuits, vol. 32, no. 12, December 1997 discloses a CMOS image sensor with analog two-dimensional DCT-based compression circuits for One-Chip cameras.

Still, the disclosed image compression is carried out using conventional techniques, in which the resolution parameter is constant for the entire image, resulting in relatively lower quality.

All the methods described above have not yet provided satisfactory solutions to the problem of on-chip image compression that is carried out in real-time and in a compact way, while obtaining a high quality image.

It is an object of the present invention to provide a method and apparatus for image compression of a high quality picture.

It is another object of the present invention to provide a method and apparatus for image compression that provide enhanced on-chip coding of an image.

It is still another object of the present invention to provide a method and apparatus for image compression that provide adaptive coding of an image, which can be carried out in real-time.

Other objects and advantages of the invention will become apparent as the description proceeds.

SUMMARY OF THE INVENTION

The present invention is directed to a method for image compression while maintaining high resolution in selected areas within the image. An acquired image is represented by a two dimensional array of M×N pixels. The array is divided into blocks of identical rectangular areas, each of which containing A×B pixels wherein A<M,N and B<M,N and M=m*A (m=2,3, . . . ); N=n*B (n=2,3, . . . ). Data related to the division of the array into blocks is stored and a threshold level for the pixel attribute value is determined. The average attribute value of each block is calculated and stored. The average attribute value of each block is compared to the average attribute value of its adjacent blocks. Whenever the difference between two adjacent compared blocks is greater then the threshold level and as long as the block size is larger than one pixel, the adjacent compared blocks are divided into sub-blocks, each of which containing A/2×B/2 pixels and data related to the division of the adjacent compared blocks into sub-blocks is stored. The average attribute value of each sub-block is calculated and the stored average attribute value of each sub-block is compared to the stored average attribute value of its adjacent sub-blocks. Whenever the difference between two adjacent compared blocks or sub-blocks is lower than, or equal to, the threshold level, the blocks or sub-blocks are represented by representative pixels with identical attribute level which are equal to the average attribute value of the pixels that correspond to the compared block or sub-block, thereby compressing the image.

The attribute value may be the pixel's intensity and/or any pixel's attribute that can be represented by an analog value. Preferably, the stored average attribute value is an analog value and the stored data related to the division of the array into blocks and/or into sub-blocks is a digital value. Preferably, the stored data related to the division of the array into blocks and/or into sub-blocks comprises indications that correspond to location of the blocks or sub-blocks in the two-dimensional array.

Preferably, the compressed image is coded by the representative pixels and the stored data related to the division of the array into blocks and/or sub-blocks, prior to the transmission of the compressed image. Image compression may be obtained in real-time by performing the following steps:

a) reading a group of rows from the two-dimensional array, which corresponds to a block dimension;

b) concurrently or parallely, compressing the portion of the image that corresponds to the group of rows and reading the next group of rows from the two-dimensional array, which corresponds to the dimension of another block;

c) repeating steps a) and b) above until all the rows of the two-dimensional array are read.

The present invention is also directed to an apparatus for image compression while maintaining high resolution in selected areas within an image. The apparatus comprises:

a) a two-dimensional array of M×N pixels;

b) a data storage bank for storing a group of pixels from the array;

c) circuitry for averaging the attributes for the group of pixels;

d) a set of one or more comparators for comparing the difference between the average attribute value of the group of pixels and the average attribute value of another group of pixels, to a predetermined threshold value;

e) circuitry for storing pixels that represent one or more adjacent groups of pixels, for which the difference is not greater than the average attribute value; and f) control circuitry for controlling data transfer between the two dimensional array and the data storage bank, for controlling the operations of the averaging circuitry, for controlling the operations of the set of one or more comparators and for controlling data transfer into the storage circuitry.

The data storage bank may be a capacitor bank. Preferably, the apparatus comprises circuitry for storing one or more analog values and/or circuitry for storing one or more digital values. The apparatus may further comprise circuitry for storing data related to the division of the array into blocks and/or into sub-blocks, and/or indications that corresponds to location of the blocks or sub-blocks in the two-dimensional array.

The apparatus may further comprise circuitry for coding the compressed image by the representative pixels and the stored data related to the division of the array into blocks and/or sub-blocks, prior to the transmission of the compressed image and a further circuitry for transmitting the coded compressed image.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1A:
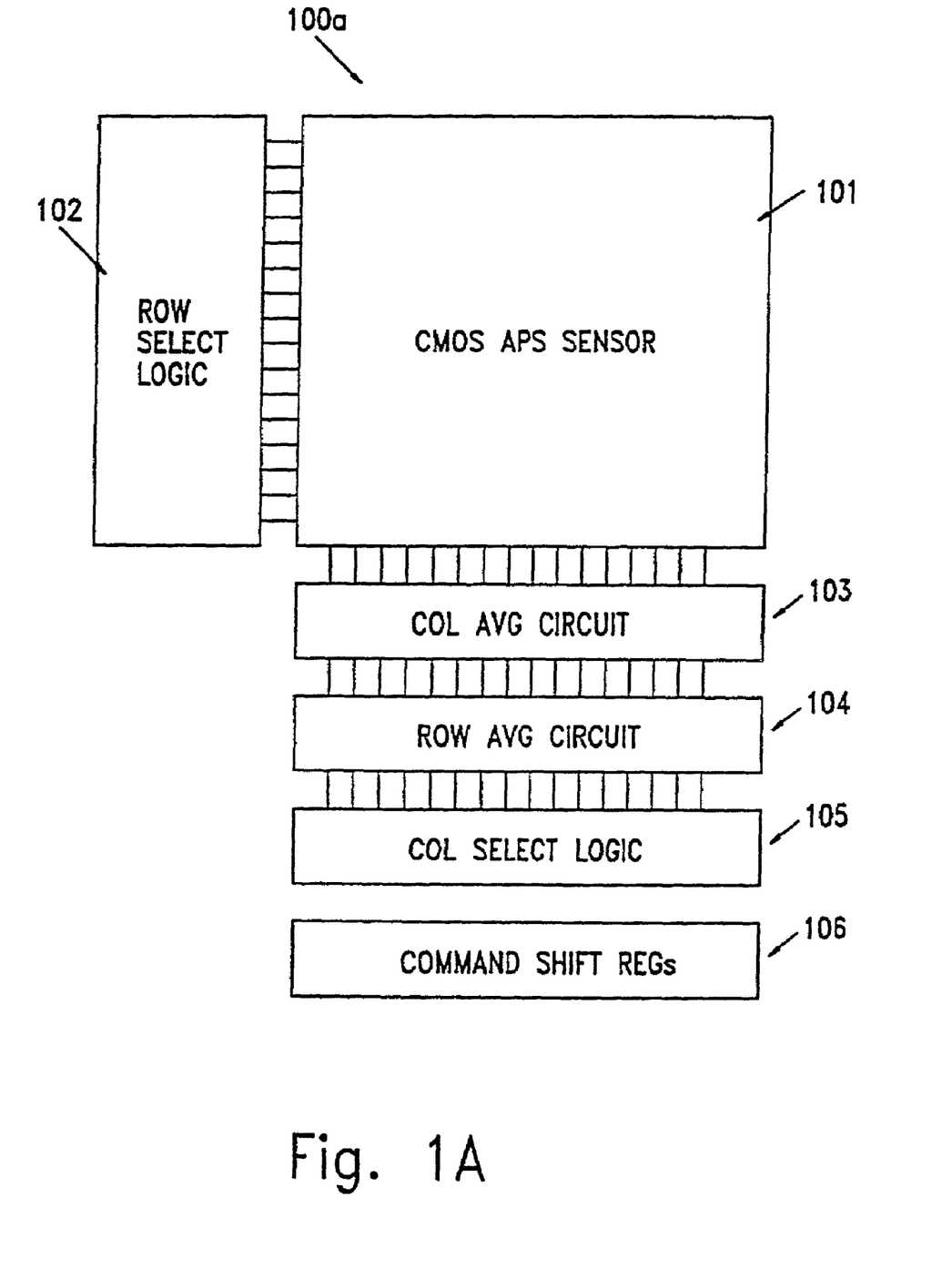
FIG. 1A (prior art) is a block diagram of a programmable multi-resolution CMOS APS architecture.

FIG. 1A is a block diagram of a programmable multi-resolution CMOS APS architecture, according to prior art. The CMOS APS 100a comprises a CMOS APS sensor 101 consisting of 128×128 photo-gate array. The imager (APS) is organized in a matrix form where the pixels are addressed by row and column addresses like the organization of a memory device, for providing random access to the sensor pixels. The APS is programmable, in order to allow readout of any size of N×N block of pixel or kernel. Each kernel value (i.e., intensity level) represents the average of all the pixel values in this region. The row select logic circuitry 102 selects a row of pixels for readout, wherein each pixel is controlled by the Row Average circuit 104. The Column Average Circuit 103 calculates the average value of the row pixel data, which has been select by the Row Select Logic circuitry 102. The Column Select Logic 105 controls which columns containing the processed data are readout. The command shift register(s) 106 controls the way that columns contain stored data for readout and where the average stored data is stored for subsequent processing. In addition, by averaging block regions of the array and reading out this average, data reduction is achieved without aliasing effects. Averaging is carried out in the column readout circuitry so that the average value is based on a full resolution image.

Figure 1B:
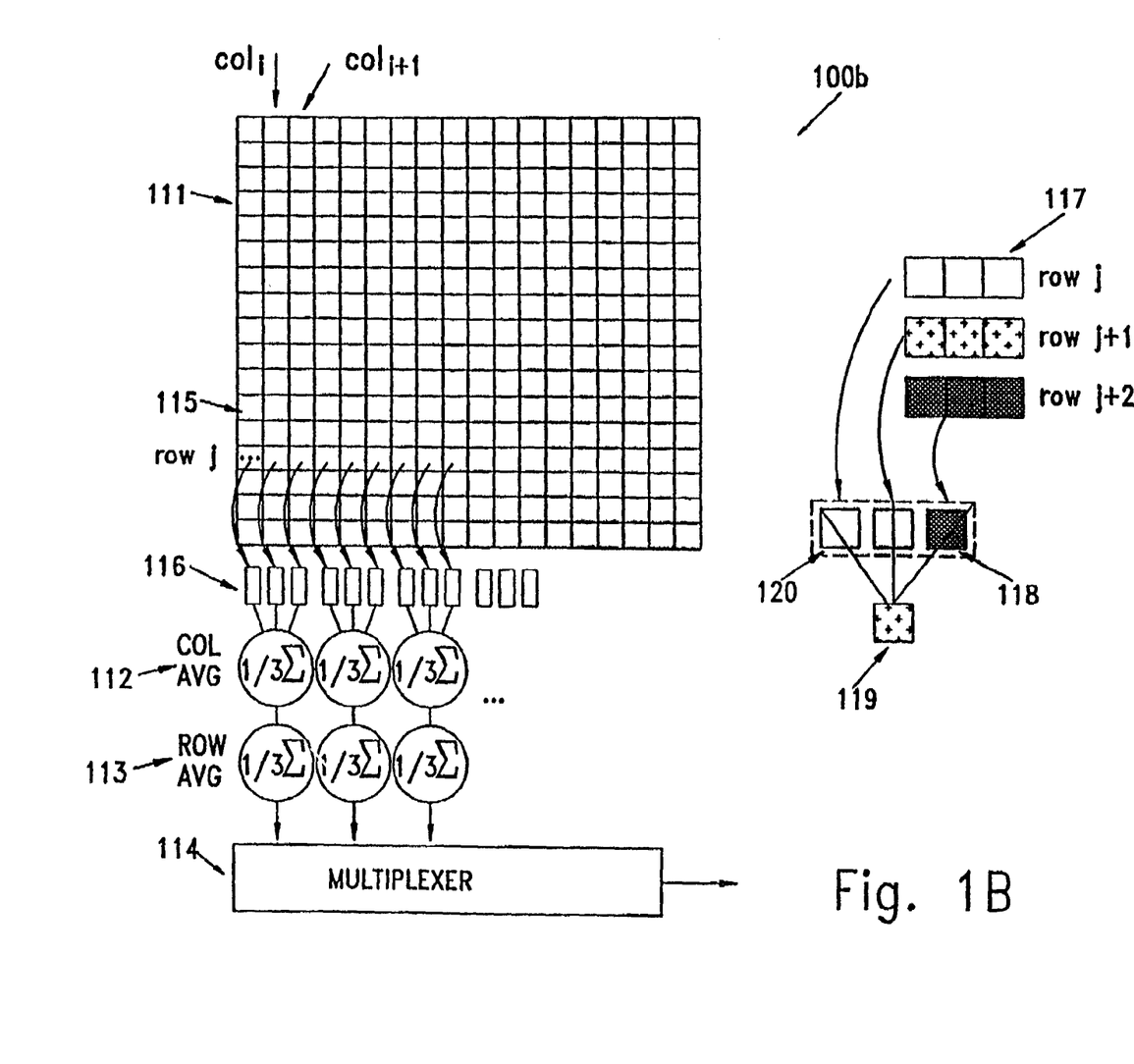
FIG. 1B (prior art) is an example of a column configuration for 3×3 block averaging.
Figure 2A:
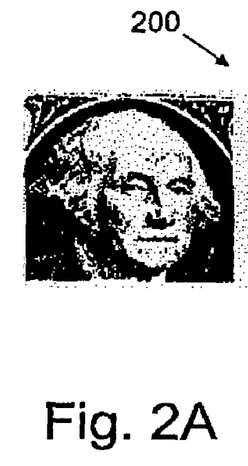
FIG. 2 (prior art) is an example of the output of a multi-resolution sensor.
Figure 2B:
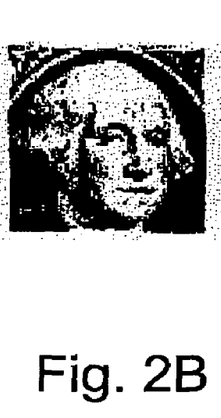
Figure 2C:
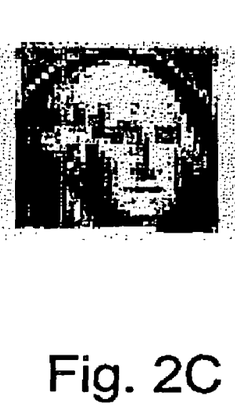
Figure 2D:
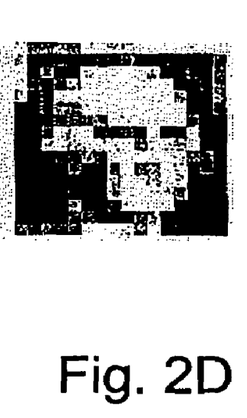

FIG. 1B (prior art) is an example of column configuration for 3×3 block averaging, according to prior art. The block averaging circuitry 100b comprises a matrix 111, which represents the image. Each cell (square) 115 in the matrix represents a single pixel with different value. The pixel values in a single row are sampled onto the column average circuitry 112 through every three switches 116. For every group of pixels 117 in row j, the average value is calculated and mapped into a cell 120. The row average circuitry 113 samples the average value of the three pixels from the column average circuitry 112 and then the next row is sampled into the column average circuitry 112. The row average circuitry 113 samples the average of the new three pixels. This process is repeated, until all three rows are processed and three samples are collected in the row average circuitry 113. After the three samples of the rows have been collected in the row average circuitry 113, their average value is calculated and mapped into a cell 118. As a result of this process, the average value 119 of the 3×3 block is stored in the row average circuitry 113. This process is repeated until the entire image is completely scanned. The multiplexer 114 sends out the coded image from the row average circuitry.

FIGS. 2A to 2D illustrates an example output of the multi-resolution sensor, according to prior art. An on-chip column circuitry performs block averaging by using programmable kernel sizes. In this example, the image of George Washington from a US one dollar bill illustrates the multi-resolution capability. The output of a programmable multi-resolution sensor is shown for images with full resolution in FIG. 2A. The outputs of a programmable multiresolution sensor are shown for images with compressed resolutions of 2×2, 4×4 and 8×8 in FIGS. 2B, 2C and 2D, respectively.

According to a preferred embodiment of the invention, the image is divided to blocks, starting with a relatively large number of pixels in each block. For example, each block may contain 8×8 pixels that represent a part of the entire image. Each block obtains a represented value that will be used in a subsequent stage. The represented value of a block is obtained by performing a suitable calculation on the attribute value of each pixel that is within the block's range. For example, calculating the average attribute value of the block's pixels, the attribute variance of the block's pixels, the attribute standard deviation of the block's pixels, the difference between the maximum and the minimum pixels attribute value in the block etc.

The subsequent stage is to compare the represented value of each block with the represented value of its adjacent blocks. If the difference between two adjacent blocks is smaller than the level of a predetermined threshold, then the resolution of the block in this location remains the same (i.e., these blocks are not being divided into sub-blocks). If the difference exceeds above the level of the predetermined threshold, then the resolution is increased by further dividing each block to sub-blocks and repeating the procedure for the adjacent sub-blocks. The procedure is repeated until the difference between neighboring blocks/sub-blocks is smaller than the threshold value, or if the highest resolution is reached. For example, the highest resolution can be determined as a single pixel, a block of 2×2 pixels etc.

According to the preferred embodiment of the invention, the threshold level, which its value defined whether to divide specific block further into smaller blocks (i.e., sub-blocks), is determined according to the specific attribute value of the pixels that was used to obtain the represented block value.

Figure 3A:
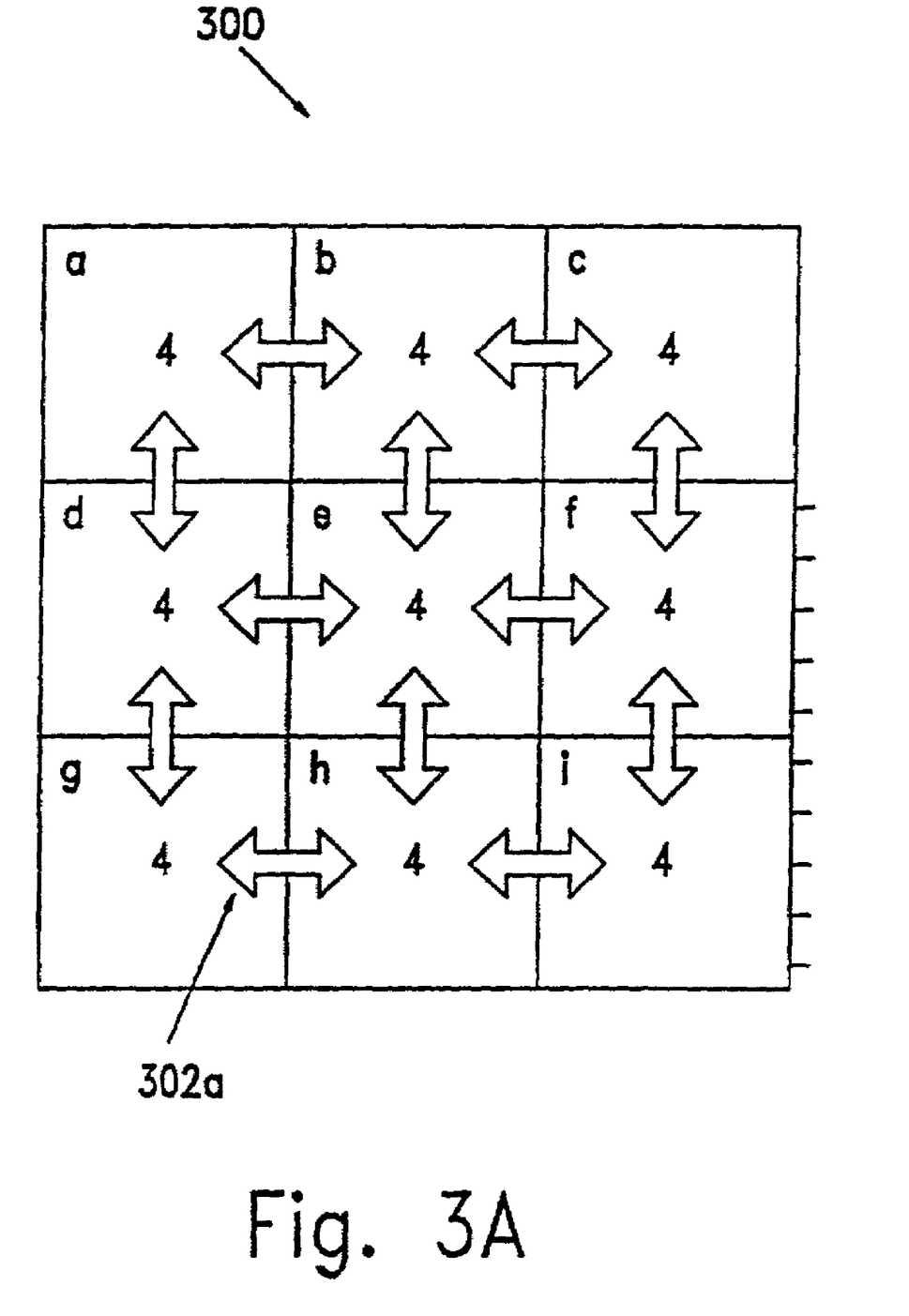
FIGS. 3A and 3B schematically illustrate a block compression of an image with adaptive multiple resolution, according to a preferred embodiment of the invention.
Figure 3B:
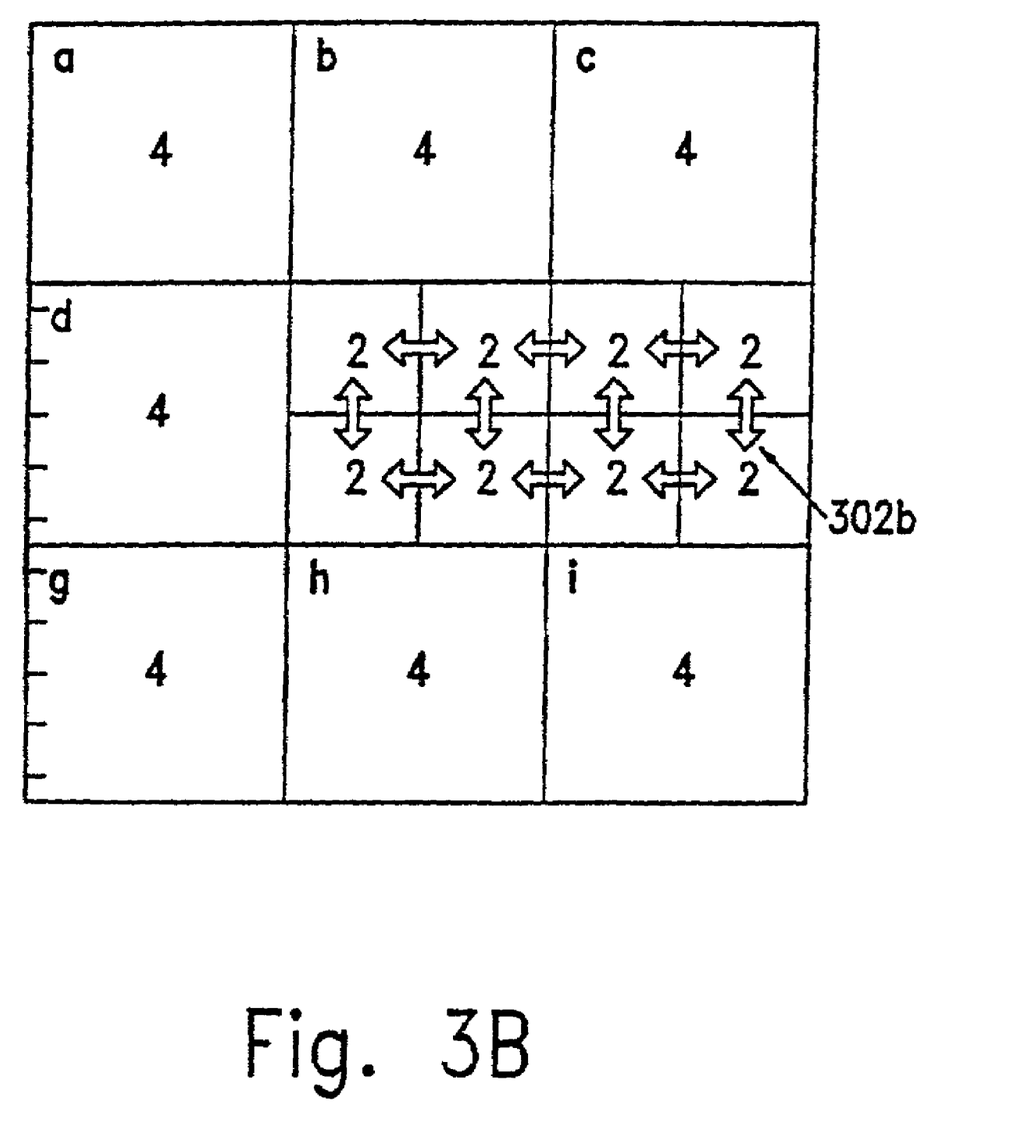

FIGS. 3A and 3B schematically illustrate a block compression of an image with adaptive multiple resolution, according to a preferred embodiment of the invention. FIG. 3A illustrates a 12×12 array 300 of pixels representing an image, which is divided into nine blocks (a, b, c, d, e, f, g, h, i) of 4×4 pixels per each block. For two neighboring blocks e and f that are currently described in resolution of 4×4 and differ in their values by more than the threshold value, the resolution at that block is increased to 2×2 as described in FIG. 3B with respect to blocks e and f. The bi-directional arrows 302a and 302b in FIGS. 3A and 3B, respectively, show the comparison operation between two neighboring blocks.

Figure 4:
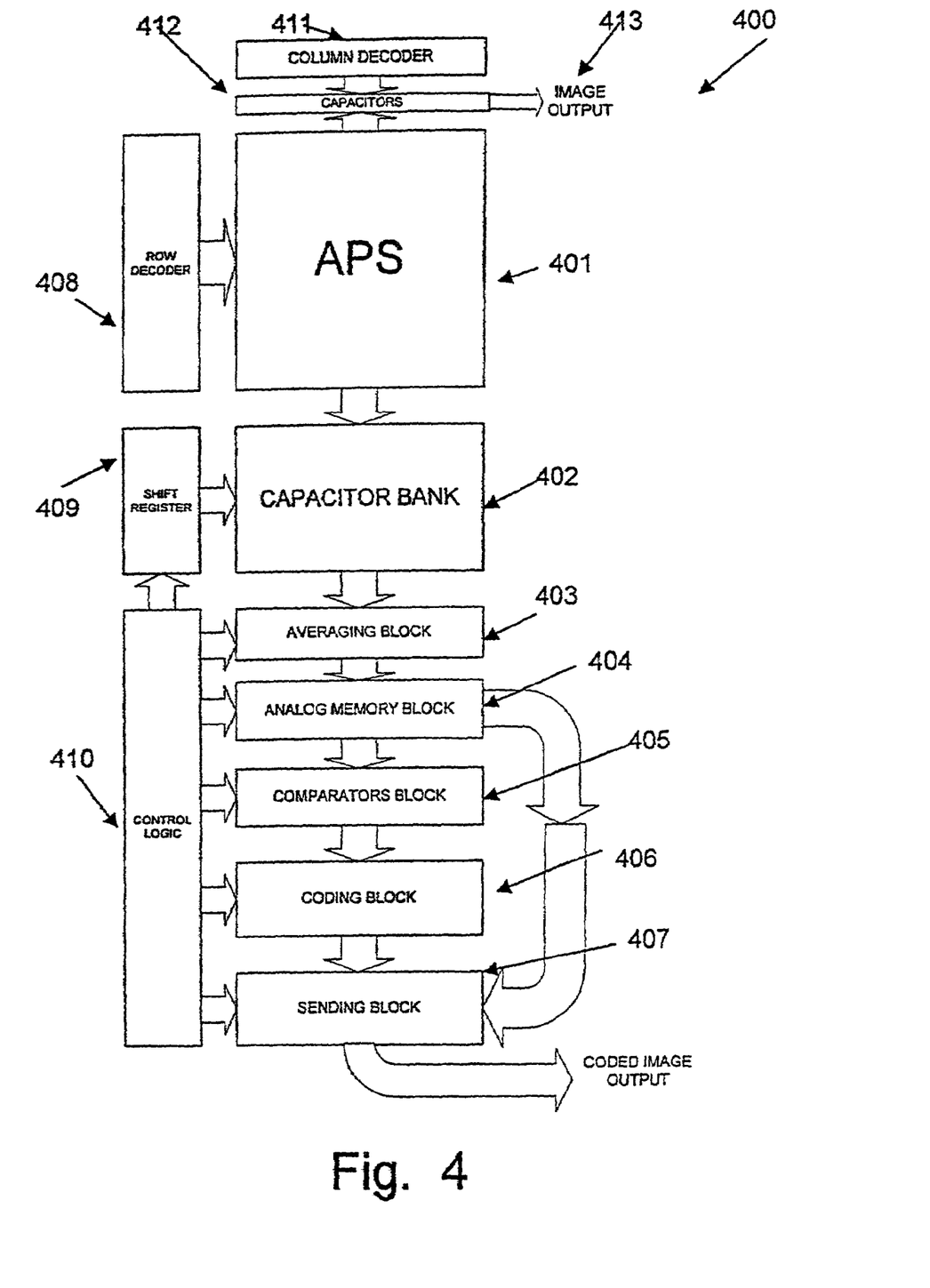
FIG. 4 is block diagram of an apparatus for providing compression of an image with adaptive multiple resolution, according to a preferred embodiment of the invention.

FIG. 4 is a block diagram of an apparatus for providing compression of an image with adaptive multiple resolution, according to a preferred embodiment of the invention. The apparatus (a chip in this example) 400 comprises an APS array 401 which contains an N×N pixel array (as described in FIG. 1A hereinabove). In order to change the resolution in a block it is required to compare its average value with the average value of its neighboring blocks. The minimal resolution in this example is A*A pixels, and therefore the capacitor bank 402 stores the data that corresponds to A rows that are intended to be encoded and their neighboring rows, consisting of additional A rows below the coded area and A rows above the coded area. The stored data consists of an analog voltage level, which is achieved by using capacitors for data storage. The capacitor bank 402 contains 3×A rows of capacitors. The row decoder 408 selects the row that is read and input to the capacitor bank 402, described hereinabove. The column decoder 411 selects the column is read and input to the capacitor bank 402. The averaging block 403 calculates the average values of the block's data that is stored in the capacitor bank 402, according to the required block size. The control logic 410 is charged with the data arriving to each of the process block. The control logic 410 selects the row that is read and input to the average block 403 by ordering it to the capacitor row decoder 409 and also operates the sets of programmable switches that are used to perform signal averaging. The analog memory block 404 stores the information related to the value of the coded block. The size of the block and its current location in the image are stored in a digital memory. The control logic 410 selects the blocks that will enter the comparators block 405. The comparators block 405 selects a difference value between two neighboring blocks values, compares it with a threshold and outputs a control signal. The control signals carry the information required for deciding whether to change (to increase) the resolution at that location, or not. The coding block 406 stores the coded data. The sending block 407 uses the combination of the analog memory block 404 and the coding block 406 that contains digital data in order to output a coded image. This combination consists of analog data, i.e. pixels value and digital data, i.e. block size and block location in the image. The digital data is varied according to changes in the block size and in the block location.

According to a preferred embodiment of the invention, the acquired (un-coded) image may be output through a separate output. The column decoder 411, the capacitors 412 and the image output 413 describe a prior art of a regular APS output. The use of regular (not coded) APS image may be required for control and comparison requirements with the coded image. The column decoder 411 samples the data that should be read, into the capacitors 412, and from the capacitors 412 the data is output as in a conventional image output 413.

On-chip adaptive multiple resolution is obtained by dividing the acquired image into blocks for low-resolution representation. The resolution is iteratively varied in areas of the image where the difference between the blocks is above a predetermined threshold value. Each block in the image is output according to its difference from its neighbors. For example, if the average gray level of a block is greater than the average value of an adjacent block by more than a predetermined threshold value, then the resolution in the block at that location is increased.

According to a preferred embodiment of the invention, the system operates in a real-time mode. In this mode, the system starts to code a portion of the image, which corresponds to read rows, while the APS continues to receive image information (pixel values) that corresponds to remaining (un-read) portions. The real-time coding is carried out according to the selected block length. The capacitor bank comprises 3*A rows. Once the middle A rows are completely coded, additional A rows may be loaded into the capacitor bank.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for image compression while maintaining high resolution in selected areas within an image, comprising:

a) representing an acquired image by a two dimensional array of M×N pixels;
b) dividing said array into blocks of identical rectangular areas, each of said blocks having a block size of A×B pixels, wherein A<M,N and B<M,N and M=m*A (m=2,3, . . . ); and N=n*B (n=2,3, . . . );
c) storing data related to the division of said array into blocks;
d) for each pixel, defining a pixel attribute value;
e) for each pixel, determining a represented value, being a representation of said pixel attribute value;
f) determining a threshold value for said pixel attribute value;
g) calculating a represented value for each block and storing said represented value;
h) comparing the represented value of each block to the represented value of its adjacent blocks;
i) whenever the difference between the represented values of two adjacent compared blocks is greater than said threshold level and as long as the block size is larger than one pixel:
　i.1) dividing said adjacent compared blocks into sub-blocks, each of which containing A/2×B/2 pixels and storing data related to the division of said adjacent compared blocks into sub-blocks;
　i.2) calculating the represented value for each sub-block and for its adjacent sub-blocks;
　i.3) comparing the stored represented value of each sub-block to the stored represented value of its adjacent sub-blocks; and
j) whenever the difference between two adjacent compared blocks or sub-blocks is lower than, or equal to, said threshold level, representing said blocks or sub-blocks by representative pixels with identical attribute level which is equal to the represented value of the pixels that correspond to said compared block or sub-block, thereby compressing said image.

2. A method according to claim 1, wherein the pixel attribute value is pixel's intensity and/or any pixel's attribute that can be represented by an analog value.

3. A method according to claim 1, wherein the represented value of a block is a value being average of all attribute values of pixels in said block.

4. A method according to claim 1, wherein the represented value of a block is a value being variance of all attribute values of pixels in said block.

5. A method according to claim 1, wherein the represented value of a block is a value being standard deviation of all attribute values of pixels in said block.

6. A method according to claim 1, wherein the represented value of a block is a value being a difference between highest pixel's attribute value in said block and lowest pixel's attribute value in said block.

7. A method according to claim 1, wherein the stored represented value of each sub-block is an analog value.

8. A method according to claim 1, wherein the stored data related to the division of said array into blocks and/or into sub-blocks is a digital value.

9. A method according to claim 1 or 8, wherein the stored data related to the division of said array into blocks and/or into sub-blocks comprises indications that corresponds to location of said blocks or sub-blocks in the two-dimensional array.

10. A method according to claim 1, further comprising coding the compressed image by representative pixels and the stored data related to the division of the array into blocks and/or sub-blocks.

11. A method according to claim 1, wherein the image compression is carried out in real-time by performing steps of:
　k) reading a group of rows from the two-dimensional array, which corresponds to a block dimension;
　l) concurrently or parallely, compressing a portion of said image that corresponds to said group of rows and reading a next group of rows, being subsequent to said group, from the two-dimensional array, which corresponds to dimension of another block;
　m) repeating steps k) and l) until all rows of said two-dimensional array are read.

12. Apparatus for image compression while maintaining high resolution in selected areas within an image, comprising:
　a) a two-dimensional array of M×N pixels;
　b) a data storage bank for storing a group of pixels from said array;
　c) sensor means for sensing analog values defined as pixels' attribute values;
　d) circuitry for calculating, from attributes, a represented value for said group of pixels;
　e) a set of one or more comparators for comparing difference between said represented value and a represented value of another group of pixels, to a predetermined threshold value;
　f) circuitry for storing data that represent one or more adjacent groups of pixels, for which said difference is not greater than said represented value; and
　g) control circuitry for controlling data transfer between said two dimensional array and said data storage bank, for controlling the circuitry for calculating, for controlling said set of one or more comparators and for controlling data transfer into said circuitry for storing data.

13. Apparatus according to claim 12, wherein the data storage bank is a capacitor bank.

14. Apparatus according to claim 12, wherein the attribute value is an intensity of a pixel and/or attribute of a pixel that can be represented by an analog value.

15. Apparatus according to claim 12, comprising circuitry for storing one or more analog values and/or circuitry for storing one or more digital values.

16. Apparatus according to claim 12 or 15, further comprising circuitry for storing data related to a division of said array into blocks and/or into sub-blocks, and/or indications that corresponds to location of said blocks or sub-blocks in the two-dimensional array.

17. Apparatus according to claim 12, further comprising circuitry for coding data stored by the circuitry for storing data by representative pixels and stored data related to a division of the array into a plurality of blocks or sub-blocks or blocks and sub-blocks.

18. Apparatus according to claim 17, further comprising circuitry for transmitting data coded by the circuitry for coding.

* * * * *